United States Patent
Lesartre et al.

(10) Patent No.: US 10,693,811 B2
(45) Date of Patent: Jun. 23, 2020

(54) AGE CLASS BASED ARBITRATION

(71) Applicant: Hewlett Packard Enterprise Development LP, Houston, TX (US)

(72) Inventors: Gregg B. Lesartre, Fort Collins, CO (US); Norell Estella Menhusen, Fort Collins, CO (US); Darel Neal Emmot, Wellington, CO (US); David P. Hannum, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/146,605

(22) Filed: Sep. 28, 2018

(65) Prior Publication Data

US 2020/0106718 A1    Apr. 2, 2020

(51) Int. Cl.
| | |
|---|---|
| *H04L 12/937* | (2013.01) |
| *H04L 12/875* | (2013.01) |
| *H04L 12/801* | (2013.01) |
| *H04L 12/863* | (2013.01) |
| *H04L 12/867* | (2013.01) |
| *H04L 12/865* | (2013.01) |

(52) U.S. Cl.
CPC ............ *H04L 49/254* (2013.01); *H04L 47/29* (2013.01); *H04L 47/39* (2013.01); *H04L 47/562* (2013.01); *H04L 47/564* (2013.01); *H04L 47/629* (2013.01); *H04L 47/6215* (2013.01); *H04L 47/6275* (2013.01)

(58) Field of Classification Search
CPC ......... H04L 47/10; H04L 49/15; H04L 49/65; H04L 49/253
See application file for complete search history.

(56) References Cited

U.S. PATENT DOCUMENTS

| | | | |
|---|---|---|---|
| 4,499,578 A | | 2/1985 | Marouf et al. |
| 4,644,496 A | | 2/1987 | Andrews |
| 5,047,917 A | * | 9/1991 | Athas ............... G06F 15/17343 |
| | | | 719/314 |
| 5,151,900 A | | 9/1992 | Snyder et al. |
| 5,267,235 A | | 11/1993 | Thacker |
| 5,386,413 A | | 1/1995 | McAuley et al. |
| 5,649,108 A | | 7/1997 | Spiegel et al. |
| 5,659,796 A | | 8/1997 | Thorson et al. |

(Continued)

FOREIGN PATENT DOCUMENTS

| | | |
|---|---|---|
| KR | 10-0825754 B1 | 4/2008 |
| WO | 00/13092 A2 | 3/2000 |
| WO | 2017/040697 A1 | 3/2017 |

OTHER PUBLICATIONS

Wikipedia.org, Uniform Memory Access, http://en.wikipedia.org/wiki/Uniform_Memory_Access, 1 page, Mar. 8, 2013.

(Continued)

*Primary Examiner* — Melanie Jagannathan

(74) *Attorney, Agent, or Firm* — Hewlett Packard Enterprise Patent Department

(57) ABSTRACT

A system, includes a plurality of sub-queues. Each sub-queue is assigned to an age class of a sequence of age classes. A set of age thresholds divides the sub-queues. A queue manager places a received transaction into a sub-queue based on a comparison of an age of the received transaction to the set of age thresholds.

16 Claims, 5 Drawing Sheets

(56) References Cited

U.S. PATENT DOCUMENTS

| | | | |
|---|---|---|---|
| 5,701,416 A | 12/1997 | Thorson et al. | |
| 5,732,087 A | 3/1998 | Lauer | |
| 5,911,152 A | 6/1999 | Wooten | |
| 5,924,119 A | 7/1999 | Sindhu et al. | |
| 5,933,610 A | 8/1999 | Chambers et al. | |
| 6,092,137 A | 7/2000 | Huang et al. | |
| 6,101,552 A | 8/2000 | Chiang et al. | |
| 6,147,976 A | 11/2000 | Shand et al. | |
| 6,167,437 A | 12/2000 | Stevens et al. | |
| 6,195,703 B1 | 2/2001 | Blumenau et al. | |
| 6,216,167 B1 | 4/2001 | Momirov | |
| 6,272,112 B1 | 8/2001 | Orita | |
| 6,407,999 B1* | 6/2002 | Olkkonen | H04Q 11/0478 370/389 |
| 6,415,361 B1 | 7/2002 | Moh et al. | |
| 6,674,720 B1* | 1/2004 | Passint | H04L 45/06 370/235 |
| 6,687,756 B1 | 2/2004 | Rawson, III | |
| 6,691,165 B1 | 2/2004 | Bruck et al. | |
| 6,721,816 B1 | 4/2004 | Magro | |
| 6,804,233 B1 | 10/2004 | Congdon et al. | |
| 6,839,794 B1 | 1/2005 | Schober | |
| 6,907,041 B1* | 6/2005 | Turner | H04L 12/5601 370/388 |
| 7,177,946 B1 | 2/2007 | Kaluve et al. | |
| 7,209,476 B1 | 4/2007 | Colloff et al. | |
| 7,395,346 B2 | 7/2008 | Pinder et al. | |
| 7,512,705 B2 | 3/2009 | Mogul | |
| 7,581,021 B2 | 8/2009 | Errickson et al. | |
| 7,593,336 B2 | 9/2009 | Varanasi et al. | |
| 7,707,635 B1 | 4/2010 | Kuo et al. | |
| 8,077,602 B2 | 12/2011 | Arimilli et al. | |
| 8,081,646 B1* | 12/2011 | Bishop | H04L 47/10 370/413 |
| 8,693,485 B2 | 4/2014 | Kotha et al. | |
| 8,706,893 B2 | 4/2014 | Even et al. | |
| 8,767,587 B1 | 7/2014 | Finn et al. | |
| 9,135,094 B2* | 9/2015 | Vasters | G06F 9/546 |
| 9,237,093 B2 | 1/2016 | Tietz et al. | |
| 9,866,467 B1 | 1/2018 | Barnum et al. | |
| 10,237,198 B2 | 3/2019 | Tietz et al. | |
| 2002/0039364 A1 | 4/2002 | Kamiya et al. | |
| 2002/0194182 A1 | 12/2002 | Fujita et al. | |
| 2003/0106052 A1 | 6/2003 | Morrison et al. | |
| 2004/0019891 A1* | 1/2004 | Koenen | G06F 9/5044 718/102 |
| 2004/0078459 A1* | 4/2004 | Moll | H04L 12/40013 709/223 |
| 2004/0228326 A1 | 11/2004 | Pearson | |
| 2005/0102477 A1 | 5/2005 | Sukegawa | |
| 2005/0108444 A1 | 5/2005 | Flauaus et al. | |
| 2005/0228926 A1 | 10/2005 | Smith et al. | |
| 2005/0228952 A1 | 10/2005 | Mayhew et al. | |
| 2006/0047907 A1 | 3/2006 | Shiga et al. | |
| 2006/0187849 A1 | 8/2006 | Hamedi | |
| 2007/0050563 A1 | 3/2007 | Alsup | |
| 2007/0064699 A1 | 3/2007 | Bernick et al. | |
| 2007/0079045 A1 | 4/2007 | Luke | |
| 2007/0091911 A1 | 4/2007 | Watanabe et al. | |
| 2007/0133415 A1 | 6/2007 | Spink | |
| 2007/0185682 A1 | 8/2007 | Eidson | |
| 2008/0037544 A1 | 2/2008 | Yano et al. | |
| 2009/0013069 A1 | 1/2009 | Gobara et al. | |
| 2009/0190588 A1 | 7/2009 | Eder et al. | |
| 2009/0210711 A1 | 8/2009 | Moskowitz | |
| 2009/0260083 A1 | 10/2009 | Szeto et al. | |
| 2010/0125683 A1 | 5/2010 | Soeda et al. | |
| 2010/0217949 A1 | 8/2010 | Schopp et al. | |
| 2011/0047439 A1 | 2/2011 | Jorda et al. | |
| 2011/0066753 A1 | 3/2011 | Wang et al. | |
| 2011/0134797 A1 | 6/2011 | Banks et al. | |
| 2011/0149986 A1 | 6/2011 | Sugawara | |
| 2011/0179208 A1 | 7/2011 | Koka et al. | |
| 2011/0185159 A1* | 7/2011 | Bishop | G06F 9/3855 712/208 |
| 2011/0213928 A1 | 9/2011 | Grube et al. | |
| 2012/0047310 A1 | 2/2012 | Satpathy et al. | |
| 2012/0072635 A1 | 3/2012 | Yoshida et al. | |
| 2013/0021910 A1 | 1/2013 | Crisan et al. | |
| 2013/0051397 A1 | 2/2013 | Guo et al. | |
| 2013/0246715 A1 | 9/2013 | Miyauchi | |
| 2013/0250792 A1 | 9/2013 | Yoshida et al. | |
| 2014/0052838 A1 | 2/2014 | Giacomoni et al. | |
| 2014/0146666 A1 | 5/2014 | Kwan et al. | |
| 2014/0241443 A1 | 8/2014 | Nowick et al. | |
| 2014/0258620 A1* | 9/2014 | Nagarajan | G06F 12/0815 711/120 |
| 2014/0359195 A1 | 12/2014 | Nishiyashiki | |
| 2015/0089053 A1 | 3/2015 | Harper et al. | |
| 2015/0172196 A1 | 6/2015 | Godbole et al. | |
| 2016/0112282 A1 | 4/2016 | Rochon | |
| 2016/0127191 A1 | 5/2016 | Nair | |
| 2016/0188469 A1 | 6/2016 | Nagarajan et al. | |
| 2016/0191420 A1 | 6/2016 | Nagarajan et al. | |
| 2016/0196233 A1 | 7/2016 | Chen et al. | |
| 2016/0266898 A1 | 9/2016 | Kitamura | |
| 2016/0292123 A1 | 10/2016 | Higuchi | |
| 2016/0292423 A1 | 10/2016 | Yao et al. | |
| 2016/0295624 A1 | 10/2016 | Novlan et al. | |
| 2016/0345307 A1 | 11/2016 | Huang et al. | |
| 2017/0046203 A1 | 2/2017 | Singh et al. | |
| 2017/0086151 A1 | 3/2017 | Chen | |
| 2017/0295112 A1* | 10/2017 | Cheng | H04L 12/6418 |
| 2017/0318335 A1 | 11/2017 | Ding et al. | |
| 2018/0159800 A1 | 6/2018 | Tietz et al. | |

OTHER PUBLICATIONS

Wikipedia.org, Non-Uniform Memory Access, http://en.wikipedia.org/wiki/Non-Uniform_Memory_Access, 4 pages, Feb. 22, 2013.

Notice of Allowance received for U.S. Appl. No. 15/370,529, dated Jun. 21, 2018, 5 pages.

Notice of Allowance received for U.S. Appl. No. 15/370,529, dated Aug. 29, 2018, 5 pages.

Non-Final Office Action received for U.S. Appl. No. 15/370,545, dated Nov. 1, 2018, 8 pages.

Non-Final Office Action Received for U.S. Appl. No. 15/370,508, dated Oct. 16, 2018, 20 pages.

Non-Final Office Action Received for U.S. Appl. No. 15/370,508, dated Mar. 28, 2018, 22 pages.

Non-Final Office Action received for U.S. Appl. No. 15/370,485, dated Aug. 23, 2018, 15 pages.

Manchanda et al., Non-Uniform Memory Access (NUMA), New York University, http://www.cs.nyu.edu/~lerner/spring10/projects/NUMA.pdf, 4 pages, 2010.

Ex Parte Quayle Action received for U.S. Appl. No. 15/370,529, dated Mar. 9, 2018, 13 pages.

Abeyratne, S. N.; "Studies in Exascale Computer Architecture"; 2017; 153 pages.

Search Report and Written Opinion received for PCT Application No. PCT/US2019/053739, dated Feb. 26, 2020, 11 pages.

* cited by examiner

10,693,811 B2

AGE CLASS BASED ARBITRATION

GOVERNMENT LICENSE RIGHTS

This invention was made with Government support under Prime Contract No. DE-AC52-07NA27344 awarded by DOE. The Government has certain rights in this invention.

BACKGROUND

Exascale fabrics must route traffic between thousands of nodes in a system. Ensuring fair even access to all nodes in such a fabric requires prioritization of the transactions that considers more than just local sources of transactions within a switch in order to prevent the relative starvation of transactions traveling longer distances through the fabric.

BRIEF DESCRIPTION OF THE DRAWINGS

Certain examples are described in the following detailed description and in reference to the drawings, in which.

DETAILED DESCRIPTION OF SPECIFIC EXAMPLES

Age based arbitration provides a mechanism to deliver fair access to each arbitration by prioritizing older traffic for selection at each arbitration point. This results in outbound traffic that is of approximately the same age when departing regardless of the age of the transactions when they arrive at the arbitration point when the fabric is under load. However, implementation of a fully accurate age based arbitration algorithm in a switch requires constant reordering of candidate packets as new packets arrive and need to be placed in the appropriate order and older packets are selected and removed. Since arbitration picks the oldest transaction that it can send given different credit availability, the transaction removed will often be from the middle of the ordered list rather than from the top. The logic and storage required to maintain a precisely ordered transaction age list at the arbitration point adds undesirable throughput delays and consumes a prohibitive amount of circuit real estate.

Implementations of the disclosed technology provide a mechanism to coarsely categorize transactions into age classes when they arrive to provide adequate enough prioritization of transactions to approximate ideal age based arbitration, while providing faster performance and requiring substantially less circuit real estate.

Figure 1A:
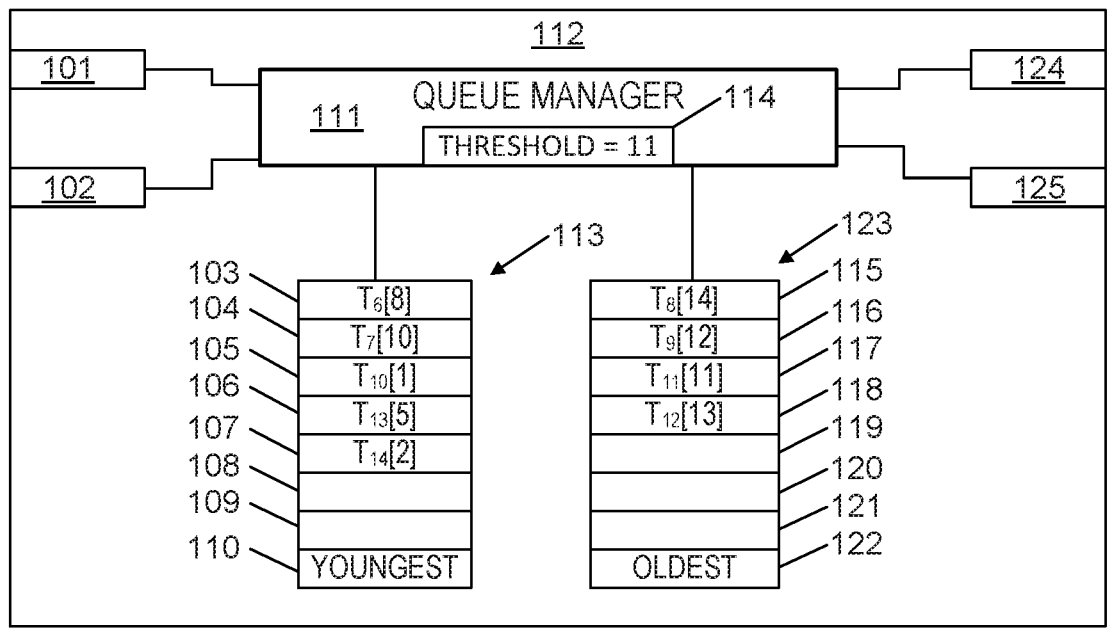
FIGS. 1A and 1B illustrate an example arbitration point employing age class based arbitration.
Figure 1B:
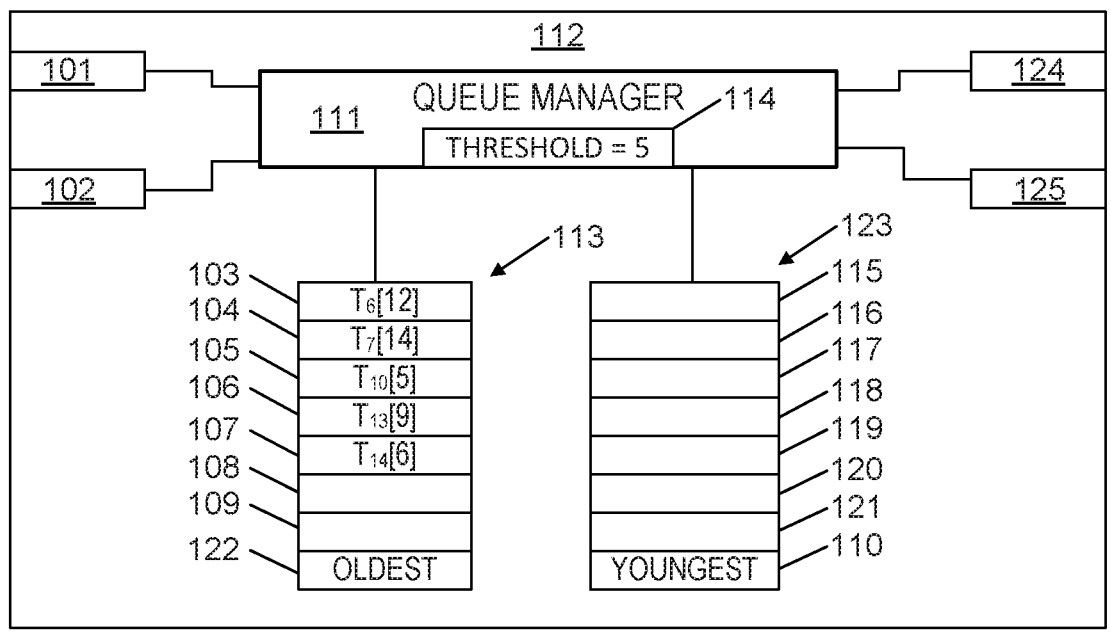

FIGS. 1A and 1B illustrate an example arbitration point employing age class based arbitration. For example, the arbitration point 112 may be a hardware device or component, such as an application specific integrated circuit (ASIC) or a field-programmable gate array (FPGA), a software component, a firmware component, or a combination thereof. The arbitration point 112 may be a network switch, a memory or I/O controller, or any other component requiring allocation of shared resources amongst competing requestors.

The arbitration point 112 comprises a plurality of input ports 101, 102, and a plurality of egress ports 124, 125. Transactions received at the input ports 101, 102 are held in sub-queues 113, 123 until they are output through egress ports 124, 125. The transaction types may vary according to implementations. For example, in a switched fabric or other network, the transactions may be flow control units (flits) or other link layer protocol data units. As another example, in a memory controller, the transactions may be memory accesses or external direct memory access requests.

In the illustrated example, transactions are labeled using the convention $T_i[x]$, where i indicates the order in which the transaction was received at the arbitration point 112 and x indicates the age of the transaction. For example, the transaction $T_6[8]$ is the $6^{th}$ transaction received by the arbitration point 112 and is 8 age ticks old. The i subscript is included for ease of understanding; in an actual implementation, a transaction may or may not include such metadata. However, a transaction will have metadata indicting the age of the transaction. For example, the age metadata may be a count value based on a system wide aging clock. As another example, the age metadata may be a local absolute time by which a transaction must be delivered. As another example, the age metadata may be a timestamp of when the transaction was generated, and the queue manager 111 may compute the age of the transactions using a current time and the transactions' timestamps. In another example, timestamps may be used directly such that the age metadata is a timestamp of when the transaction is generated and the age thresholds (discussed below) are timestamps.

The arbitration point 112 comprises a queue manager 111. For example, the queue manager 111 may be hardware-based logic on an application specific integrated circuit (ASIC) or other device composed of hardware-based logic, firmware or software executed by a processor, or a combination thereof. The queue manager 111 maintains two sub-queues 113, 123. Each sub-queue 113, 123 comprises a plurality of slots 103-109, 115-121 respectively, to store transactions waiting to be output. For example, each sub-queue may be a buffer or portion of a buffer. Additionally, the queue manager 111 maintains a single age threshold 114 used to divide the sub-queues 113, 123. In the illustrated example, each sub-queue 113, 123 is maintained in first in, first out (FIFO) order. However, other implementations may utilize other buffer management orderings.

Referring to FIG. 1A, each sub-queue 113, 123 is assigned to an age class 110, 122 of a sequence of age classes. In this example, the sequence of age classes has a length of two (i.e., there is an "oldest" age class and a "youngest" age class). When transaction is received, the queue manager 111 inspects the transaction's age and places the received transaction into a sub-queue based on a comparison of the age of the received transaction to the age threshold 114. If the age of the transaction is greater than the age threshold (if timestamps are used as age indicators, if the timestamp is less than the threshold), then the transaction is placed into the queue 123 assigned to the oldest age class. If the age of the transaction is less than the age threshold, then the transaction is placed into the queue 113 assigned to the youngest age class. In the illustrated example, if the transaction age is equal to the threshold age, it is placed into the oldest sub-queue 123. In other implementations, it could be placed into the youngest sub-queue 110. The received transaction is placed into the end of the sub-queue (in FIG. 1A, $T_{14}$ was the last received transaction, and was placed the youngest sub-queue 113; $T_{12}$ was the last transaction placed into the oldest sub-queue 123). Accordingly, the transactions in each sub-queue will generally not be ordered by age.

As discussed above, in some cases, the age metadata may be a local time by which the transaction must be delivered. For example, the time by which the transaction must be delivered may be based on age of the transaction is received, a maximum time in which a transaction may remain in the fabric, and the number of hops in the network. The parameters used to determine the time by which the transaction must be delivered may be configured variable. For example, it may be preconfigured during system design or may be parameters programmable through a system manager. In these examples, the age threshold 114 may be a delivery time. If the maximum delivery time for a received transaction is later than the threshold delivery time, then the transaction is placed into the youngest sub-queue 113. If the maximum delivery time for the received transaction is earlier than the threshold, then the transaction is placed into the oldest sub-queue 123.

In a FIFO implementation, the queue manager 111 preferentially selects the first available transaction from the sub-queue 123 assigned to the oldest age class possible, where a transaction is available to be sent if sufficient resources exist to send the transaction. For example, if resources are available, then the queue manager 111 will select the transaction in slot 115, $T_8[14]$, to send next. The transaction manager 111, will select the first available transaction in the youngest queue 113 only if there are no available transactions in the oldest queue 123. With this algorithm, younger transactions that arrive before older transactions may be selected first, but only within the a given window, after which a dwindling pool of older transactions will all be serviced before younger transactions held in the youngest queue are considered.

When the sub-queue currently assigned to the oldest age class (i.e., sub-queue 123 in FIG. 1A) is empty, then that sub-queue is assigned to the youngest age class, and each other sub-queue is assigned to the next older age class. In an implementation with two sub-queues, the oldest and youngest assignments simply swap.

FIG. 1B illustrates the arbitration point 112 of FIG. 1A immediately after an age class reassignment. In this example, for the sake of explanation, the four transactions in the oldest age queue 123 have been sent, and the age count values have incremented four times. As discussed above, the counts are based on the passage of time, independent of the transactions that have been sent or received. The queue manager has updated the age assignments 122, 111 such that queue 113 is now the oldest queue and queue 123 is now the youngest queue. In the illustrated implementation, the queue manager 111 maintains the age assignments by tagging the queues 113, 123 with age classifications. In other implementations, the queue manager 111 could maintain the age assignments by moving the transactions in the youngest queue to the oldest queue.

In addition to updating the age assignments 122, 110, the queue manager 111 updates the age threshold 114. The threshold 114 may be determined based on the age of the youngest transaction in the youngest sub-queue. In the illustrated example, the threshold 114 is set to 5, which is the age of the youngest transaction in the youngest queue (i.e., $T_{10}[5]$). In other examples, the threshold 114 may be determined as another function of the age of the youngest transaction. For example, the threshold 114 may be the age of the youngest transaction offset by an offset age. A positive offset increases the threshold, which increases the minimum age for transactions to enter the oldest queue. A negative offset decreases the threshold, which decreases the minimum age for transactions to enter the oldest queue. The offset age may be set during design or may be a programmable parameter and may be set according to desired arbitration behavior. For example, a smaller positive offset may better approximate ideal age-based arbitration at the expense of a larger queue depth in the youngest queue and more frequent age class reassignment.

In some implementations, the queue manager 111 stores a minimum age threshold. Like the offset, the minimum age threshold may be a programmable value that may be set during design or system configuration. The queue manager 111 places all received transactions younger than the minimum age threshold in the youngest queue. When swapping the queue age assignments, the queue manager 111 may update the age threshold 114 to be the age of the youngest transaction in the youngest queue that is greater than the minimum age threshold. Alternatively, if the youngest transaction in the youngest queue is younger than the minimum age, or if no transactions are older than the minimum age threshold, the queue manager 111 may update the threshold 114 to be the minimum age threshold. In these implementations, some transactions younger than the age threshold that were received prior to the reassignment may remain in the oldest queue In some implementations, if the youngest sub-queue is empty when the oldest sub-queue empties, then the queue manager 111 sets the threshold to be the age of the next received transaction plus a value. The queue may use this same procedure during startup when the queue manager 111 receives its first transaction. In some cases, the value may be the same as the offset age. In other cases, the value may the same as the minimum age threshold. In other cases, the value is a default value different than the offset age and the minimum age threshold. In these cases, the default value may be a programmable value that may be set during system configuration or during system design.

In the example illustrated in FIGS. 1A and 1B, the queue manager 111 maintains the threshold 114 dynamically such that the threshold 114 increments at the same rate as the age count values of the transactions. Accordingly, over time, between age class reassignments, more transactions are steered into the younger queue and the total number of transactions in the older queues wanes and eventually empties, triggering the next age class reassignment. In the illustrated example, the threshold 114 would have been 15 immediately prior to the reassignment.

In other examples, the queue manager 111 may employ other methods of maintaining the threshold. For example, in an implementation where maximum delivery times are assigned to transactions, during age reassignment, the threshold 114 may be set as the maximum delivery time of the youngest transaction in the youngest queue. In these implementations, the threshold 114 is static between age class reassignments. The threshold 114 may be kept static because younger transactions on the fabric will have later maximum delivery time than older packets.

As another example, the queue manager 111 may track the oldest transaction in the youngest sub-queue and use that age/timestamp as the threshold. In this example, if the oldest transaction in the youngest sub-queue is outputted, then the queue manager 111 will update the threshold according to the oldest remaining transaction in the youngest sub-queue.

In such an implementation, transactions with an age equal to the threshold age will be placed into the youngest sub-queue.

Figure 2A:
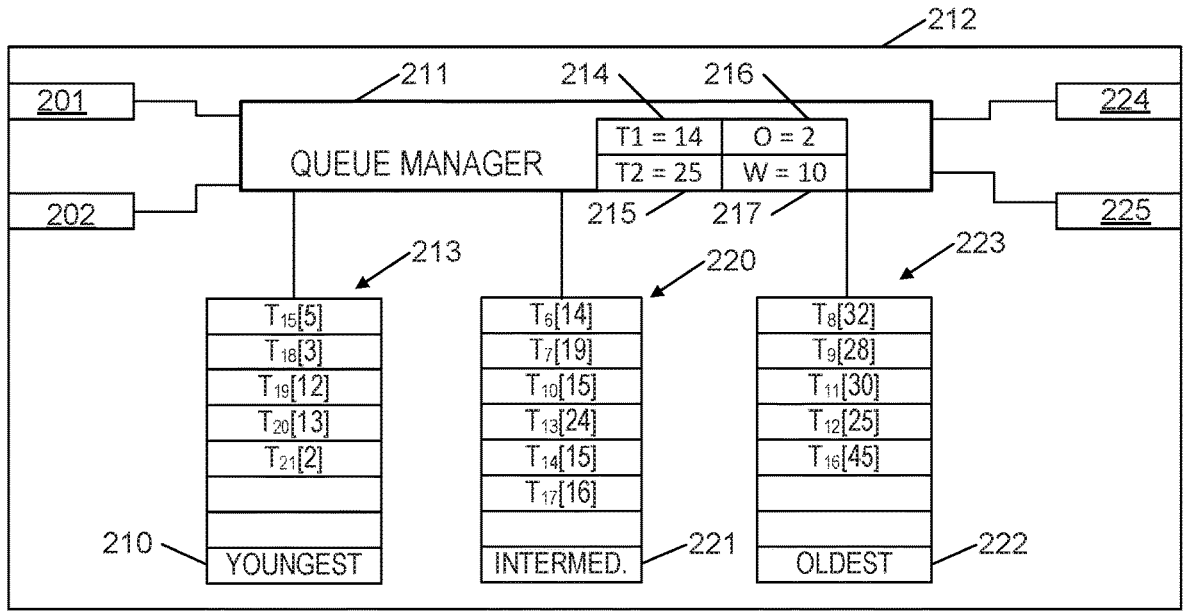
FIGS. 2A and 2B illustrate an example arbitration point with three queues assigned to a sequence of three age classes.
Figure 2B:
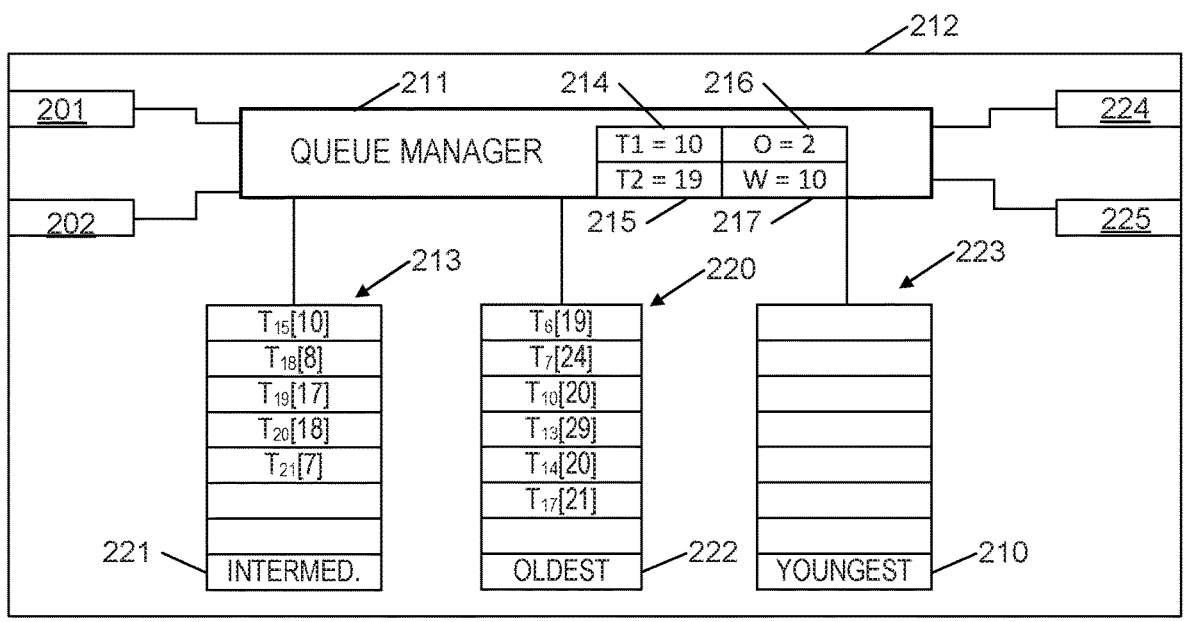

FIGS. 2A and 2B illustrate an example arbitration point with three queues assigned to a sequence of three age classes. The arbitration point 212 comprises a set of inputs 201, 202 and a set of outputs 224, 225. These elements may be as described with respect to elements 101, 102, 124, and 125 of FIGS. 1A and 1B, respectively.

The arbitration point 212 further comprises three sub-queues 213, 220, 223. Each of the sub-queues is assigned to an age class of a sequence of age classes. In FIG. 2A, sub-queue 213 is assigned to a youngest age class 210, sub-queue 220 is assigned to an intermediate age class 221, and sub-queue 223 is assigned to an oldest age class 223. The queue manager maintains a set of age thresholds 214, 215 dividing the sub-queues. Threshold 214 divides the youngest and intermediate sub-queues. Threshold 215 divides the intermediate and oldest sub-queues. For three age classes, there are two age thresholds dividing the sub-queues. In general, for n age-classes, n–1 age thresholds divide the corresponding n subqueues.

When a transaction is received, the queue manager 211 places the received transaction into a sub-queue based on a comparison of an age of the received transaction to the set of age thresholds. The queue manager 211 places the received transaction into the oldest possible sub-queue whose age threshold it exceeds. For example, in FIG. 2A, a received transaction with an age of 26 would be placed into the oldest sub-queue 223, a received transaction with an age of 20 would be placed into the intermediate sub-queue 220, and a received transaction with an age of 10 would be placed into the youngest sub-queue 213. As in FIGS. 1A and 1B, received transactions with ages equal to one of the age thresholds are placed into the older of the sub-queues that the threshold divides. In other implementations, such received transactions may be placed into the younger of the sub-queues divided by the age threshold.

In some implementations, if sufficient resources are available, the queue manager 212 selects the first transaction in the oldest non-empty sub-queue to output. If sufficient resources are not available to send the first transaction, the queue manager 212 does not select any transaction to be output. For example, each transaction may have a different size requirement, and there may be insufficient credits to send the first transaction of the oldest sub-queue. Rather than skipping that first transaction, Ts[32], the queue manager 212 may wait for sufficient credits to accumulate to send it. This may prevent smaller transactions later in the sub-queue from continually bypassing the first, larger, transaction.

In other implementations, for example, in implementations, where the transactions from different credit pools may be present in the same sub-queue, the the queue manager 212 may select a transaction to output from the sub-queue assigned to the oldest age class that has an available transaction. For example, if sufficient resources are available, the queue manager 212 will select $T_8[32]$ as the next transaction to output. If there are not sufficient resources to send any of the transactions in the oldest queue 223, then the queue manager 212 will select the first available transaction from the intermediate queue 220. If there are insufficient resources for any of the oldest or intermediate transactions, then the queue manager 211 will select the first available transaction from the youngest queue 213.

When the sub-queue assigned to an oldest age class is empty, the queue manager assigns the sub-queue currently assigned to the oldest age class to the youngest age class and assigns each other sub-queue with the next older age class in the sequence. For example, FIG. 2B illustrates the arbitration point 212 immediately after sub-queue reassignment. After the sub-queue 223, which was assigned to the oldest age class 222, is empty, the queue manager 211 assigned the sub-queue 223 to the youngest age class 210. The sub-queue 213, which was assigned to the youngest age class 210, is assigned to the intermediate age class 221. The sub-queue 220, which was assigned to the intermediate age class 221, is assigned to the oldest age class 222.

During the age class reassignment, each threshold 214 is updated based on the age of the youngest transaction in the youngest sub-queue. For example, threshold 214, which divides the youngest and intermediate sub-queues is updated based on the age of the youngest transaction in the sub-queue 213 that was assigned to the youngest age class and is now assigned to the intermediate age class. Each other threshold becomes the threshold for the next older sub-queue. For example, threshold 215, which divides the intermediate and the oldest sub-queues is to the previously value of threshold 214 immediately before reassignment. In the illustrated example, the threshold 214 was 19 immediately before reassignment, so threshold 215 is set to 19.

In some implementations where the queue manager 211 may select a transaction from a younger sub-queue than the oldest sub-queue, the queue manager 211 may set the threshold 215 to be the age of the youngest transaction in the intermediate sub-queue. In other such implementations, the queue manager 211 may set the threshold 215 to the last value of the threshold 214.

In this example, the queue manager 211 stores and maintains an offset 216 and a minimum window size 217. As discussed above, the offset is a configurable parameter that allows a system manager to balance frequency of sub-queue reassignments with fidelity to ideal age-based arbitration. The minimum window size 217 is a configurable parameter that determines the minimum age threshold for the first age threshold, as well as the minimum difference between two sequential age thresholds. If the age of the transaction that would otherwise be selected of an age threshold is greater than the next-older age threshold minus the window size, then the age threshold is set to be the next-older age threshold minus the window size. For example, in FIG. 2B, the youngest transaction in the youngest queue 213 had an age of 7 when reassignment occurred, which would result in a threshold 214 of 9 after the offset 216. However, this is less than the minimum window size, so the queue manager 211 sets the first threshold 214 to be 10. Here, the next threshold 225 is 21, which is greater than the minimum window size. However, if the next threshold 225 was less than 20, the queue manager 211 would set the second threshold 215 to 20.

In some implementations, separate queues may be allocated in the arbitration point for various granularities of shared resources. Each of the separate queues may comprise a plurality of sub-queues managed as discussed above. For example, the disclosed technology may be implemented in a system utilizing traffic classes (TC) mapped to one or more different virtual channels (VCs) with credit-based flow control for the transmission of flits on links. For example, each VC, egress port may have a separate credit pool used for flow control. In some implementations, each VC, egress port pair is allocated a separate queue composed of a plurality of sub-queues assigned to age class. For example, a system with 8 VCs and 2 egress ports would have 16 different queues. In other implementations, each VC is allocated a separate queue. For example, a system with 8 VCs would have 8 different queues. In still further implementations, a single queue may be used, each traffic class's VCs may share a queue, or another granularity of queue allocation may be employed.

Figure 3A:
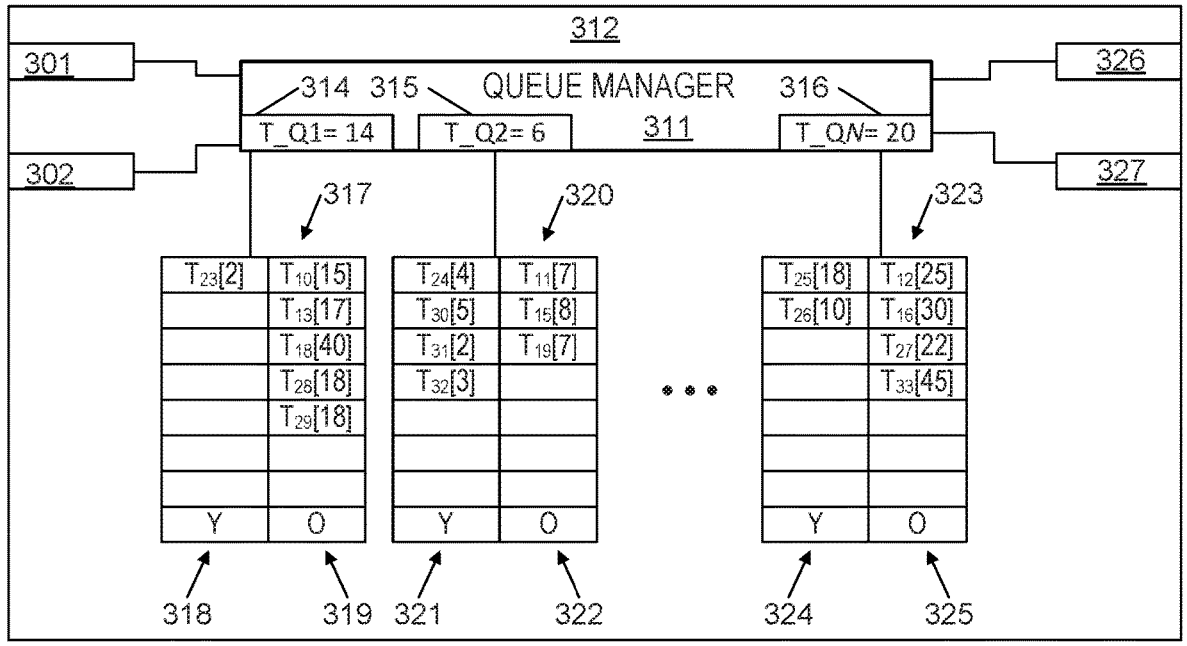
FIGS. 3A and 3B illustrate an example arbitration point with a plurality of queues.
Figure 3B:
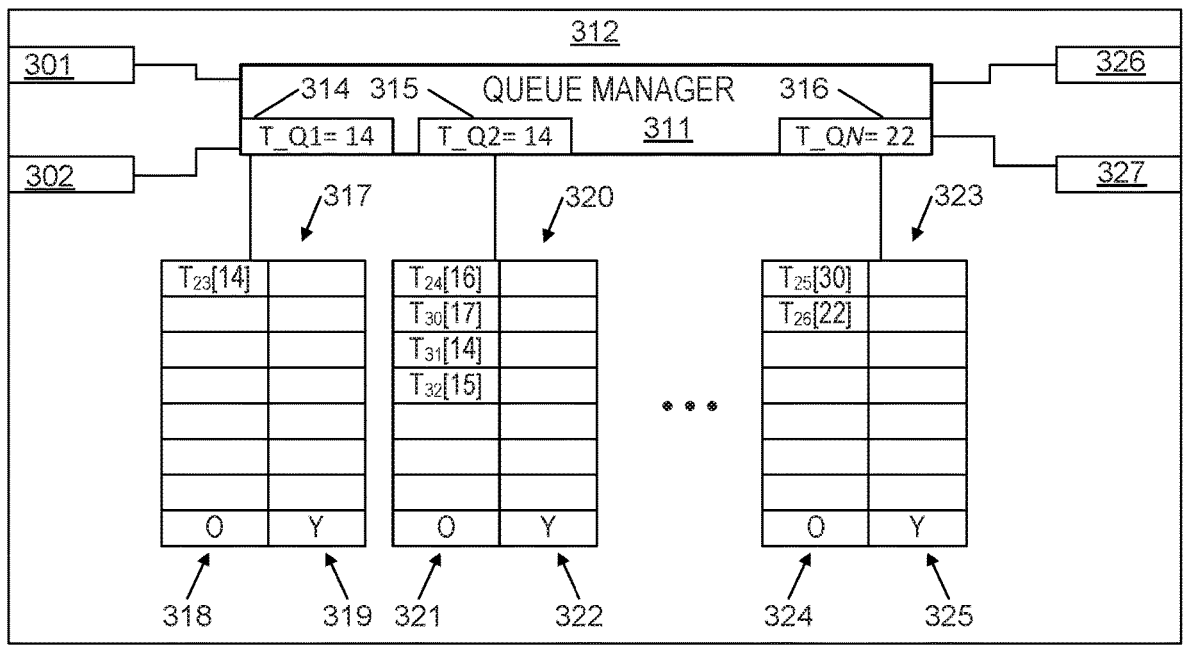

FIGS. 3A and 3B illustrate an example arbitration point with a plurality of N queues. For example, FIGS. 3A and 3B may illustrate a queue for each VC, egress port pair, or a queue for each VC. In this example, the arbitration point 312 comprises a plurality of ingress ports 301, 302, and a plurality of egress ports 326, 327. These elements may be as described with respect to elements 101, 102, 124, and 125 of FIGS. 1A and 1B, respectively.

Each of the N queues 317, 320, 323 comprises a plurality of sub-queues 318 & 319, 321 & 322, 324 & 325. In this implementation, each queue has two sub-queues assigned to an oldest and youngest age class, as described with respect to FIGS. 1A and 1B. However, in other implementations, each queue may comprise a plurality of sub-queues greater than two, as described with respect to FIGS. 2A and 2B. Additionally, in some implementations, the different queues may have different numbers of sub-queues.

In the illustrated example, the queue manager 311 maintains N sets 314, 315, 316 of age thresholds, one for each of the N queues 317, 320, 323. For example, this may accommodate situations where traffic classes for large transactions are expected to accumulate more queuing delay than those associated with sparse, fast transactions. In other examples, the queue manager 311 may maintain some number of sets of thresholds that are shared by multiple queues. For example, if a queue is allocated to each VC, egress pair, then a set of thresholds may be maintained for each VC. As another example, thresholds may be shared by all queues assigned to a single traffic class's VCs. As a further example, a single set of thresholds may be used for all of the queues.

The queue manager 311 manages each of the queues as described above. The queue manager 311 places a transaction received at one of the ingress ports 301, 302 is stored into one of the queues 317, 320, 323 according to the queue granularity and the transaction's metadata. For example, the transaction may be placed into a queue based on the transaction's VC, or based on the transaction's VC and egress port. The queue manager 311 then places the transaction into a sub-queue of the queue based on a comparison of the age of the transaction to the threshold(s) associated with the queue. For example, in FIG. 3A, the last received transaction was $T_{33}[45]$, which was placed in queue 323. Queue N 323 has a two sub-queues assigned to two age-classes, and so has a single threshold 316 T_QN dividing the sub-queues. The age of the transaction was 45 age ticks, so the transaction was placed into the end of the oldest sub-queue 325.

As discussed above, when outputting a transaction from one of the queues, the queue manager 311 selects the first available transaction from the oldest possible sub-queue. The queue manager 311 may select which queue will provide that transaction through various methods. For example, the queue manager may compare the age of the first entry of each of the oldest non-empty sub-queues of the set of queues with resources available (e.g. available credits). In FIG. 3A, assuming there are sufficient resources to send transactions from each of the queues and none of the unillustrated queues have older first transactions, then the queue manager 311 will select queue N 323 to provide the next transaction. Assuming resources are available, the queue manager 311 will then select transaction $T_{12}[25]$ as the next output transaction. In other implementation, the queue manager 311 may select a candidate queue using other methods, such as round-robin.

In some implementations, the queue manager 311 manages each queue's sub-queue age-class reassignment separately. In other implementations, the queue manager 311 synchronizes the age-class reassignments for subsets of the queues or for the entire set of queues. FIGS. 3A and 3B illustrate a synchronized implementation where the queue manager 311 performs the age class reassignment for all of the queues 317, 320, 323 once all of the oldest sub-queues 319, 322, 325 are empty. FIG. 3B illustrates the arbitration point 312 immediately after such a synchronized queue reassignment, 12 aging ticks after the state of the arbitration point 312 in FIG. 3A.

In this example, each queue has an independent age threshold dividing the two sub-queues. The queue manager 311 updates each age threshold according to the youngest transaction in the corresponding youngest sub-queue. In this example, the queue manager 311 sets the thresholds equal to the youngest transaction in the corresponding sub-queue. However in other implementations, the queue manager 311 may add an offset to the age to determine the threshold, as discussed above.

Figure 4:
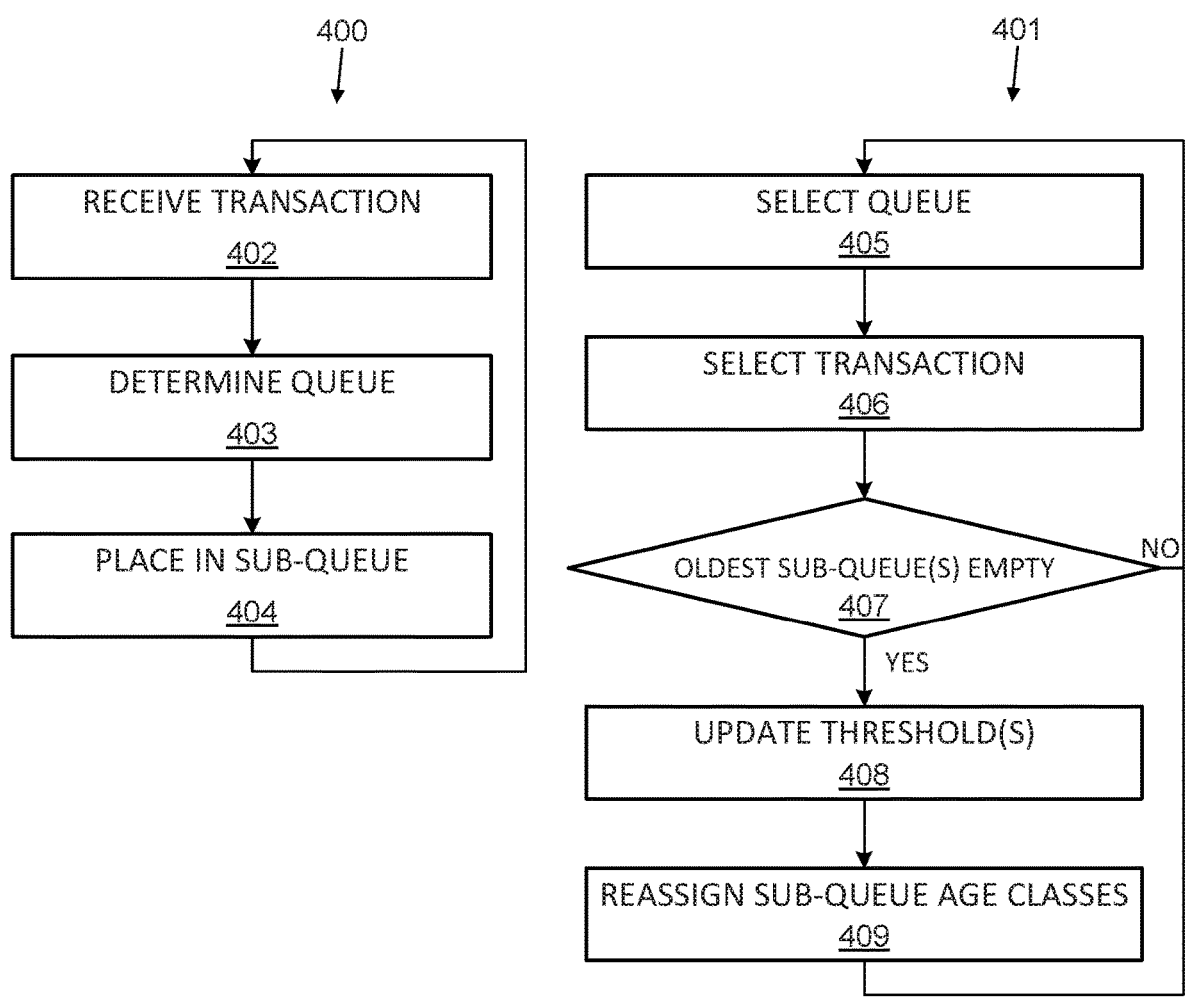
FIG. 4 illustrates a method of operation of an arbitration point.

FIG. 4 illustrates a method of operation of an arbitration point. For example, any of the arbitration points of FIGS. 1-3 may operate as illustrated in this method. The method includes two process flows 400 and 401. Flow 400 illustrates the operation of the arbitration point receiving transactions, while flow 401 illustrates the operation of the arbitration point outputting transactions. These flows may be performed by the arbitration point concurrently.

Flow 400 includes block 402. Block 402 comprises receiving a transaction. For example, block 402 may comprise an arbitration point receiving a transaction at an ingress port. As discussed above, the transaction types may vary according to implementations. For example, in a switched fabric or other network, the transactions may be flow control units (flits) or other link layer protocol data units. As another example, in a memory controller, the transactions may be memory accesses or external direct memory access requests.

Flow 400 further comprises block 403. Block 403 may be performed in an implementation with multiple queues, each divided into a plurality of sub-queues. Block 403 comprises determining a queue in which to place the transaction. The queue may be determined using various information related to the transaction, which may depend on the specific implementation. An arbitration point may have varying levels of queue granularity. For example, there may be one queue for each credit pool, on queue for each VC; one queue for each VC, egress port pair; one queue for the VCs sharing a traffic class; one queue for each traffic class, egress port pair; or other granularity. Block 403 may use the virtual channel assignment of the transaction, the egress port for the transaction, or other information to place the transaction into one of the queues.

The method further includes block 404. Block 404 comprises comparing an age of the transaction to a threshold age and placing the transaction into a sub-queue based on the comparison. If the transaction is younger than the threshold age, the transaction is placed into a first sub-queue. If the transaction is older than the threshold age, the transaction is placed into the second sub-queue. If the transaction is equal to the threshold age it may be placed into either the first or second sub-queue, depending on the implementation details. For example, the first and second sub-queues may be to sub-queues assigned to a pair of sequential elements of a sequence of age-classes, where the first sub-queue is assigned to the younger age-class of the pair and the second sub-queue is assigned to the older age-class of the pair.

Flow 400 repeats for each received transaction. As discussed above, the different queues may have differently valued age thresholds dividing the sub-queues. In such an application, when a second transaction associated with a second queue (e.g., associated with a second credit pool) is received, the age of the second transaction is compared to a second age threshold. The second transaction is placed into a first sub-queue of the second queue if the second transaction is younger than the second threshold age. The second transaction is placed into a second sub-queue of the second queue if the second transaction is older than the second threshold age. For example, the first and second sub-queues may be to sub-queues assigned to a pair of sequential elements of a sequence of age-classes, where the first sub-queue is assigned to the younger age-class of the pair and the second sub-queue is assigned to the older age-class of the pair.

Flow 401 illustrates a process flow for outputting transactions and performing age class reassignment. Flow 401 begins with block 405. Block 405 includes selecting a candidate queue to provide a transaction. For example, block 405 may include selecting a queue by evaluating the set of queues with sufficient resources (e.g., sufficient credits) by comparing a next transaction from the second sub-queue of the first queue and a next transaction from the second sub-queue of the second queue. As another example, block 405 may comprise selecting a next queue according to a round-robin order, a random ordering, or other order. Block 406 comprises selecting a transaction from the selected queue. For example, block 406 may comprise selecting the first transaction from the oldest possible sub-queue for which sufficient resources are available. Block 406 may further comprise outputting the selected transaction.

The flow continues to block 407. In an implementation where sub-queue age class reassignment is synchronized amongst all of the queues, or amongst a subset of queue, block 407 comprises determining if the oldest sub-queues of the synchronized queues are all empty. In an implementation where sub-queue age class reassignment is unsynchronized, block 407 comprises determining if the oldest sub-queue of the queue selected in block 405 is empty (i.e., if the transactions sent in block 406 was the last transaction in the sub-queue). If so, then the flow proceeds to block 408. If not, then the flow proceeds back to block 405.

Block 408 comprises updating the age thresholds for the sub-queues. For example, as discussed above, block 408 may comprise updating each age threshold based on the age of the youngest transaction in the younger of the two sub-queues which the threshold being updated divides. Block 408 may further include applying an offset age to the age of the youngest transaction, or applying a minimum age as the age threshold instead of the age of the youngest transaction.

Block 409 comprises reassigning the sub-queue age classes of the queues being updated. Block 409 may include assign the sub-queue currently assigned to the oldest age class to a youngest age class and to assign each other sub-queue with a next older age class in the sequence. In an implementation utilizing two sub-queues, this comprises switching the age class assignment of the two sub-queues. After sub-queue age class reassignment, the flow continues to block 405 to send the next transaction.

Figure 5:
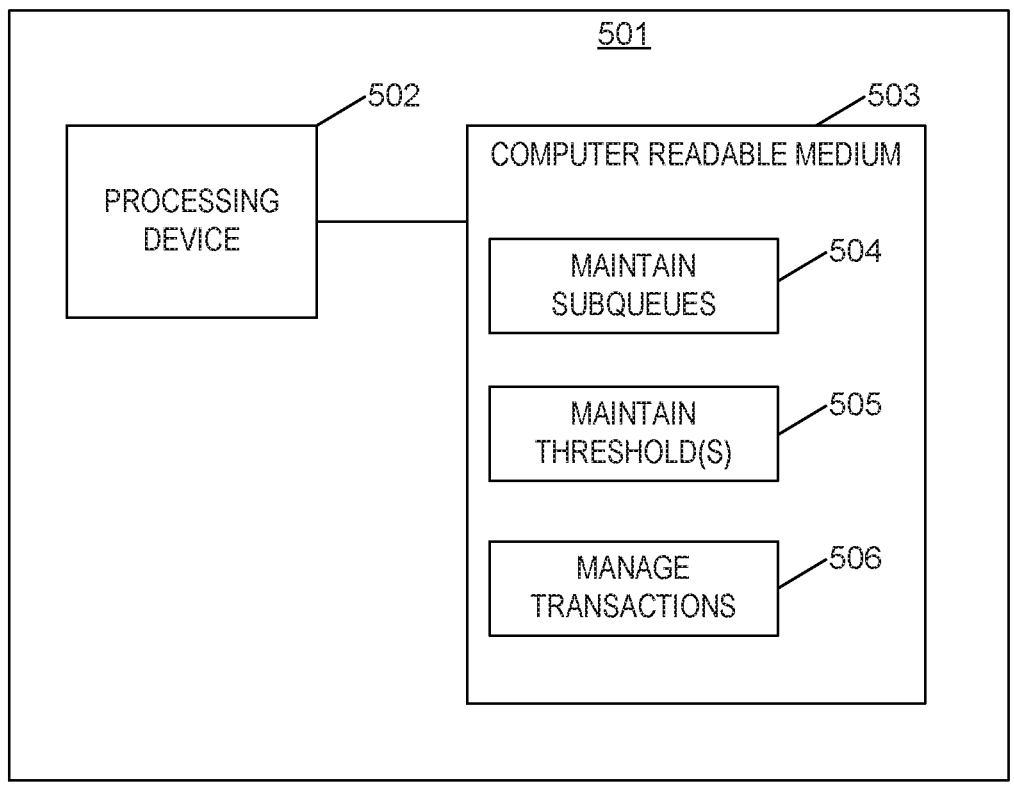
FIG. 5 illustrates an example system including a processing device and a non-transitory computer readable medium storing instructions for sub-queue and transaction management.

FIG. 5 illustrates an example system 501 including a processing device 502 and a non-transitory computer readable medium storing instructions for sub-queue and transaction management. For example, the system may be a network switch, a bridge device, a gateway, an aggregator, or any other system where transaction contention for resources is decided by an arbitration point.

The system 501 includes a processing device 502. For example, the processing device 502 may a central processing unit, network processor, or other controller. The system 501 further includes a non-transitory computer readable medium 503 storing instructions 504-506. For example, the medium 503 may comprise volatile or non-volatile random access memory (RAM), read only memory (ROM), flash memory or other solid state storage, a hard disk, or other storage device, or any other computer readable medium.

The instructions include instructions 504 that are executable by the device 502 to maintain a plurality of sub-queues, where each sub-queue is assigned to an age class of a sequence of age classes. For example, the plurality of sub-queues may be a plurality of FIFO sub-queues as described above. The instructions 504 may be further executable to update the class assignments of the sub-queues on certain triggering conditions. For example, as described above, the sub-queues may be reassigned to new age classes once the sub-queue assigned to an oldest age class is empty.

In some implementations, the instructions 504 may include instruction to maintain a plurality of queues, with each queue divided into a plurality of age class-assigned sub-queues. As described above, the age-class reassignments of the sub-queues of the different queues may be managed concurrently or independently according to the system implementation.

The instructions further include instructions 505 that are executable by the device 502 to maintain a set of age thresholds dividing the sub-queues. If the plurality of sub-queues is a pair of sub-queues, then the set of age thresholds has a single age threshold. The age thresholds may be determined and updated upon age class reassignment in any of the manners described herein.

The instructions further include instructions 506 that are executable by the device 502 to manage receiving and sending transactions. The instructions 506 are executable to place a received transaction into a sub-queue based on a comparison of an age of the received transaction to the set of age thresholds. For example, the instructions 506 may be executable to place the received transaction at the end of a sub-queue based on the comparison to an age threshold. Additionally, the instructions 506 may be executable to select a queue for the transaction based on information associated with the transaction, such as VC, traffic class, egress port, quality of service, or other information depending on the granularity of the queues.

The instructions 506 are further executable to manage sending transactions. For example, instructions 506 may be executable to select a queue by evaluating the set of queues with sufficient resources (e.g., sufficient credits) by comparing a next transaction from each of the sub-queues assigned to the oldest age-class. As another example, instructions 506 may be executable to select a next queue according to a round-robin order, a random ordering, or other order. Instructions 506 may be executable to select a transaction from the selected queue. For example, instructions 506 may be executable to select the first transaction from the oldest sub-queue for which sufficient resources are available to be output. Instructions 506 may be further executable to output the selected transaction.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A system, comprising:
   a plurality of sub-queues, each sub-queue assigned to an age class of a sequence of age classes;
   a set of age thresholds dividing the sub-queues;
   queue manager to place a received transaction into a sub-queue based on a comparison of an age of the received transaction to the set of age thresholds;
   wherein the queue manager is to, when the sub-queue assigned to an oldest age class is empty, assign the sub-queue currently assigned to the oldest age class to a youngest age class and to assign each other sub-queue with a next older age class in the sequence;
   wherein there are two sub-queues in the plurality of sub-queues, a first sub-queue assigned to the youngest age class and a second sub-queue assigned to the oldest age class;
   the queue manager switches the age class assignment of the first and second sub-queues when the sub-queue assigned to the oldest age class is empty; and
   the set of age thresholds is a single age threshold; and
   wherein the single age threshold is equal to the age of the youngest transaction in the sub-queue assigned to the youngest age class immediately prior to the queue manager switching the age class assignment plus an offset age.

2. The system of claim 1, wherein each age threshold of the set of age thresholds is determined based on an age of a youngest transaction in a sub-queue when the sub-queue is assigned to the next older age class.

3. The system of claim 2, wherein each age threshold is the corresponding age of the youngest transaction plus an offset age.

4. The system of claim 1, wherein the queue manager is to store a minimum age threshold, and to place received transactions younger than the minimum age threshold into the sub-queue assigned to the youngest age class.

5. The system of claim 1, wherein the plurality of sub-queues is associated with a first virtual channel (VC) of a plurality of VCs, the system further comprising:
   pluralities of sub-queues associated with each of the plurality of VCs, each of the sub-queues assigned to an age class of the sequence of age classes.

6. The system of claim 5, wherein the queue manager is to select a plurality of sub-queues by comparing the ages of the first transaction in the sub-queues assigned to the oldest age class that are associated with VCs that have credits to send a transaction.

7. The system of claim 5, wherein the queue manager is to, when each sub-queue assigned to an oldest age class is empty, assign each sub-queue currently assigned to the oldest age class to a youngest age class and to associate each other sub-queue with a next older age class in the sequence.

8. The system of claim 7, further comprising:
   a plurality of sets of age thresholds, each set of age thresholds dividing the sub-queues of one of the pluralities of sub-queues.

9. The system of claim 7, wherein the set of age thresholds divides each of the pluralities of sub-queues.

10. The system of claim 1, wherein each of the sub-queues is a first in, first out (FIFO) sub-queue.

11. The system of claim 1, wherein the plurality of sub-queues is associated with a first egress port, virtual channel (VC) pair of a plurality of egress port, VC pairs, the system further comprising:
    a plurality of sub-queues associated with each of the plurality of egress port, VC pairs, each of the pluralities of sub-queues assigned to an age class of the sequence of age classes; and
    a plurality of sets of age thresholds, each set of age thresholds dividing the sub-queues of one of the pluralities of sub-queues.

12. The system of claim 1, wherein the queue manager is to select a transaction to output from the sub-queue assigned to the oldest age class that has an available transaction.

13. The system of claim 1, wherein the queue manager is to store the age of the received transaction as an incrementing age count value and to increment the thresholds of the set of thresholds at the same rate as the age count value.

14. The system of claim 1, wherein the queue manager is to store the age of the received transaction as a maximum time for delivery, and to store the thresholds of the set of thresholds as delivery time thresholds.

15. A method comprising:
    receiving a transaction associated with a first credit pool;
    comparing an age of the transaction to a threshold age;
    placing the transaction in a first sub-queue of a queue associated with first credit pool if the transaction is younger than the threshold age; and
    placing the transaction in a second sub-queue of the queue if the transaction is older than the threshold age;
    receiving a second transaction associated with a second credit pool;
    comparing an age of the second transaction to a second threshold age;
    placing the second transaction in a first sub-queue of a second queue associated with the second credit pool if the second transaction is younger than the second threshold age; and
    placing the second transaction in a second sub-queue of the second queue if the second transaction is older than the second threshold age.

16. The method of claim 15, further comprising:
    selecting a transaction to output by comparing a next transaction from the second sub-queue of the first queue and a next transaction from the second sub-queue of the second queue.

* * * * *